UNITED STATES PATENT OFFICE.

CORNELIUS MASSACIŬ, OF PANKOW, NEAR BERLIN, AND AUGUST NEUMANN, OF CHARLOTTENBURG, GERMANY.

PROCESS FOR THE TREATMENT OF VOLCANIC ROCKS.

1,202,556.  Specification of Letters Patent.  Patented Oct. 24, 1916.

No Drawing. Application filed May 9, 1913, Serial No. 766,657. Renewed August 9, 1916. Serial No. 114,071.

*To all whom it may concern:*

Be it known that we, Dr. CORNELIUS MASSACIŬ and AUGUST NEUMANN, subjects of the German Emperor, residing at, respectively, Pankow, near Berlin, Germany, and Charlottenburg, Berlin, Germany, have invented a certain new and useful Process for the Treatment of Volcanic Rocks, of which the following is a specification.

In studying various minerals or rocks of volcanic origin, such as trass, trachyte, phonolite, palagonite-tuff, etc., as regards their capacity of exchanging their bases, it was found, that this property of volcanic rocks is mainly due to the glassy or vitreous constituent of the same, while the materials which had previously solidified in the originally liquid magma, such as feldspar, sanidine, augite, etc., possess this capacity of exchange either not at all or only to an insignificant extent. Further researches have shown now, that even in the same kind of rock the exchangeability may be subject to fluctuation, which consequently, after the possessor of this exchangeability has been discovered, can only be attributed to a special change of condition or a special structural condition of the same. The microscopic examination of the rocks mentioned above has actually shown, that the glassy rock may be in different physical conditions. For instance the fresh glass, when in the shape of thin polished sheets, is transparent, clear and colorless or with only a slight yellow tint, and it produces simple optical refraction. If such clear glass is subjected to a very sharp enlargement in an immersion microscope, wherein objects are observed under oil in order to reduce refraction of rays as much as possible, it frequently shows spots which apparently have been subject to atmospheric decay, appearing turbid and flaky and showing an uneven structure. On polarized light this material has no effect and must therefore be described as amorphous. If the polished sheets of these various glassy constituents are treated with dyes, such as methylene blue, they show a remarkable contrast as regards their structure. By this treatment the clear homogeneous glass base is not tinted even after a long time, but the product of atmospheric decay, which has a larger surface and above all high porosity becomes tinted. It follows, that in the volcanic rocks only the products of atmospheric decay of the glass substance have a porous structure, the said products thus allowing the liquids to penetrate easily, whereby the capacity of exchange is materially enhanced. It is therefore reasonable to assume, that this property of the rocks mentioned at the beginning must be attributed mainly, if not exclusively, to this decayed glass rock. For supporting or elucidating this view the behavior of the glass before and after artificial decay has been studied. As a measure for the exchange the capacity of absorption of these glassy materials before and after hydration by means of Knop's ammonium chlorid solution has been ascertained (see *Anleitung für Wissenschaftl. Bodenuntersuchung* by W. Wahnschaffe 1887, page 101). The decay caused by the influence of the atmosphere consists mainly in the absorption of water by the glassy substance. This interpolation of hydroxyl groups causes a loosening of the entire structure, whereby the permeability and porosity of the material is enhanced. Artificially the same process of hydration of the rock may be produced by means of boiling water under pressure or by high-pressure steam. It may be produced also by means of steam with the aid of alkaline substances, such as alkali-metal hydroxid, alkaline-earth hydroxid, alkali-metal carbonate, alkali-metal-silicate, etc., and neutral alkali-salts may be added to the material during hydration or afterward, if necessary, to avoid a slimy or gelatinous condition of the reaction product.

We have found, that as a rule the capacity of exchange substantially increases after the artificial hydration. For instance, while 5 grams of a natural trachyte-tuff from the vicinity of the Lake of Laachen absorbed in the untreated condition 32 milligrams of nitrogen, this capacity of absorption increased after hydration with alkali under pressure to about 50 milligrams per 5 grams of the material. In another case 5 grams of a natural palagonite-tuff from the Westerwald absorbed before hydration 39 milligrams of nitrogen and after hydration 71 milligrams. In this manner the capacity of exchange increased also with regard to other bases.

What we claim is:—

1. The process for treating volcanic rocks having a vitreous character to render them capable of exchanging their bases or for enhancing this property, which consists in treating such rocks with steam under pressure.

2. The process of treating volcanic rocks having a vitreous character to render them capable of exchanging their bases or for enhancing this property, which consists in treating such rocks with steam under pressure in the presence of alkaline materials.

In testimony whereof we have hereunto set our hands in presence of two subscribing witnesses.

Dr. CORNELIUS MASSACIŬ.
AUGUST NEUMANN.

Witnesses:
  HENRY HASPER,
  WOLDEMAR HAUPT.